United States Patent
Schumann

(10) Patent No.: US 12,332,417 B2
(45) Date of Patent: Jun. 17, 2025

(54) OPTICAL SYSTEM FOR A LIGHT SHEET MICROSCOPE

(71) Applicant: LEICA MICROSYSTEMS CMS GMBH, Wetzlar (DE)

(72) Inventor: Christian Schumann, Lich (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 556 days.

(21) Appl. No.: 17/770,321

(22) PCT Filed: Oct. 22, 2020

(86) PCT No.: PCT/EP2020/079681
§ 371 (c)(1),
(2) Date: Apr. 20, 2022

(87) PCT Pub. No.: WO2021/078825
PCT Pub. Date: Apr. 29, 2021

(65) Prior Publication Data
US 2022/0390730 A1 Dec. 8, 2022

(30) Foreign Application Priority Data
Oct. 23, 2019 (DE) ................. 10 2019 128 681.6

(51) Int. Cl.
*G02B 21/00* (2006.01)
*G02B 21/36* (2006.01)

(52) U.S. Cl.
CPC ....... *G02B 21/0032* (2013.01); *G02B 21/367* (2013.01)

(58) Field of Classification Search
CPC .............. G02B 21/0032; G02B 21/361; G02B 21/0076; G02B 21/0036
See application file for complete search history.

(56) References Cited

U.S. PATENT DOCUMENTS 4,723,842 A * 2/1988 Twisselmann ......... G02B 21/24
359/836
8,582,203 B2 11/2013 Dunsby
(Continued)

FOREIGN PATENT DOCUMENTS

DE 102014102215 A1 8/2015
DE 102015209756 A1 12/2016
(Continued)

OTHER PUBLICATIONS

U. Krzic et al., "Multiview light-sheet microscope for rapid in toto imaging," Nature Methods, vol. 9, pp. 730-733, Jul. 2012, Nature America, Inc., US.
(Continued)

*Primary Examiner* — Christopher Stanford
(74) *Attorney, Agent, or Firm* — LEYDIG, VOIT & MAYER, LTD.

(57) ABSTRACT

An optical system for a light-sheet microscope comprises transporting optics configured to project, into a sample, a light sheet for illuminating a sample plane positioned obliquely to an optical axis of the transporting optics and to project the illuminated sample plane into an intermediate image space. The transporting optics comprises an interchanging system that includes a first light-deflection element and a second light-deflection element. The interchanging system is configured to switch an illumination direction along which the light sheet illuminates the sample by alternately introducing the first light-deflection element and the second light-deflection element into a beam path of the transporting optics. The first light-deflection element causes a partial image inversion in only one direction. The second light-deflection element causes a complete image inversion in two directions.

20 Claims, 8 Drawing Sheets

(56) References Cited

U.S. PATENT DOCUMENTS

| | | | |
|---|---|---|---|
| 10,061,111 B2 * | 8/2018 | Hillman | G02B 21/0052 |
| 10,831,014 B2 * | 11/2020 | Hillman | G02B 21/361 |
| 10,852,520 B2 * | 12/2020 | Hillman | G02B 21/0032 |
| 2005/0128573 A1 | 6/2005 | Merz | |
| 2017/0068080 A1 | 3/2017 | Anhut et al. | |
| 2018/0149854 A1 | 5/2018 | Siebenmorgen et al. | |
| 2019/0049711 A1 | 2/2019 | Schumann | |
| 2021/0072524 A1 | 3/2021 | Fahrbach | |

FOREIGN PATENT DOCUMENTS

| | | | |
|---|---|---|---|
| DE | 102016103182 A1 | 8/2017 | |
| DE | 102016103182 B4 | 4/2018 | |
| DE | 102017116380 B3 | 12/2018 | |
| DE | 102018204940 A1 | 10/2019 | |
| DE | 3615842 A1 | 3/2020 | |
| WO | WO-2018069170 A1 * | 4/2018 | G01N 21/6458 |

OTHER PUBLICATIONS

Wu et al., "Spatially isotropic four-dimensional imaging with dual-view plane illumination microscopy," Nature Biotechnology, vol. 31, pp. 1032-1038 Nov. 2013, Nature America, Inc., US.

Swoger et al., "Multi-view image fusion improves resolution in three-dimensional microscopy," Optics Express, vol. 15, Issue 13, pp. 8029-8042, Jun. 25, 2007, The Optical Society, US.

* cited by examiner

OPTICAL SYSTEM FOR A LIGHT SHEET MICROSCOPE

CROSS REFERENCE TO RELATED APPLICATIONS

This application is a U.S. National Phase application under 35 U.S.C. § 371 of International Application No. PCT/EP2020/079681, filed on Oct. 22, 2020, and claims benefit to German Patent Application No. DE 10 2019 128 681.6, filed on Oct. 23, 2019. The International Application was published in German on Apr. 29, 2021 as WO 2021/078825 A1 under PCT Article 21(2).

FIELD

Embodiments of the present invention relate to an optical system for a light-sheet microscope, comprising transporting optics configured to project into a sample a light sheet for illuminating a sample plane positioned obliquely to the optical axis of the transporting optics and to project the illuminated sample plane into the intermediate image space. The invention further relates to a method for illuminating a sample in a light-sheet microscope.

BACKGROUND

In oblique-plane microscopy according to Dunsby (U.S. Pat. No. 8,582,203 B2), the detection plane lies obliquely in the sample. As a result, only a limited angular range and thus only a partial range of the spatial frequencies of the sample is detected, by contrast with the coverage of the frequency space when a plane is detected perpendicularly to the optical axis. In addition, the illumination light sheet propagates as far as the sample region through a part of the sample, leading to the scattering and shadowing artifacts which are known from light-sheet microscopy.

In conventional light-sheet microscopy there are known rotational devices or mounted accessories that enable detection from a plurality of directions, as known for example from U. Krzic et al., Nature Methods, Volume 9, pp. 730-733 (2012). In oblique-plane microscopy, U.S. Pat. No. 8,582,203 B2 and DE 10 2016 103 182 B4 describe mounted accessories comprising image-field rotation systems, such as Abbe-Koenig rotators.

An advantage of oblique-plane microscopy is the compatibility with conventional sample formats. Due to installation on multiple sides, known as a "multiview lightsheet", optical accessibility of the sample from the opposite direction is also necessary. However, this is incompatible with conventional sample formats such as Petri dishes or multi-well plates. In addition, mounted accessories as known from Wu et al., Nature Biotechnology, Volume 31, pp. 1032-1038 (2013), are unsuitable for investigations in multi-well plates and require duplication of the beam paths, which is cost-intensive.

Using image-field rotation systems is unfavorable for practical reasons. Due to the finite tolerances of the bearings and of the prism surfaces, it is difficult in practice to guarantee the narrow tolerances of the pupil-imaging centering that have to be adhered to due to the "remote focusing" on which oblique-plane microscopy is based.

SUMMARY

In an embodiment, the present invention provides an optical system for a light-sheet microscope. The optical system comprises transporting optics configured to project, into a sample, a light sheet for illuminating a sample plane positioned obliquely to an optical axis of the transporting optics and to project the illuminated sample plane into an intermediate image space. The transporting optics comprises an interchanging system that includes a first light-deflection element and a second light-deflection element. The interchanging system is configured to switch an illumination direction along which the light sheet illuminates the sample by alternately introducing the first light-deflection element and the second light-deflection element into a beam path of the transporting optics. The first light-deflection element causes a partial image inversion in only one direction. The second light-deflection element causes a complete image inversion in two directions

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
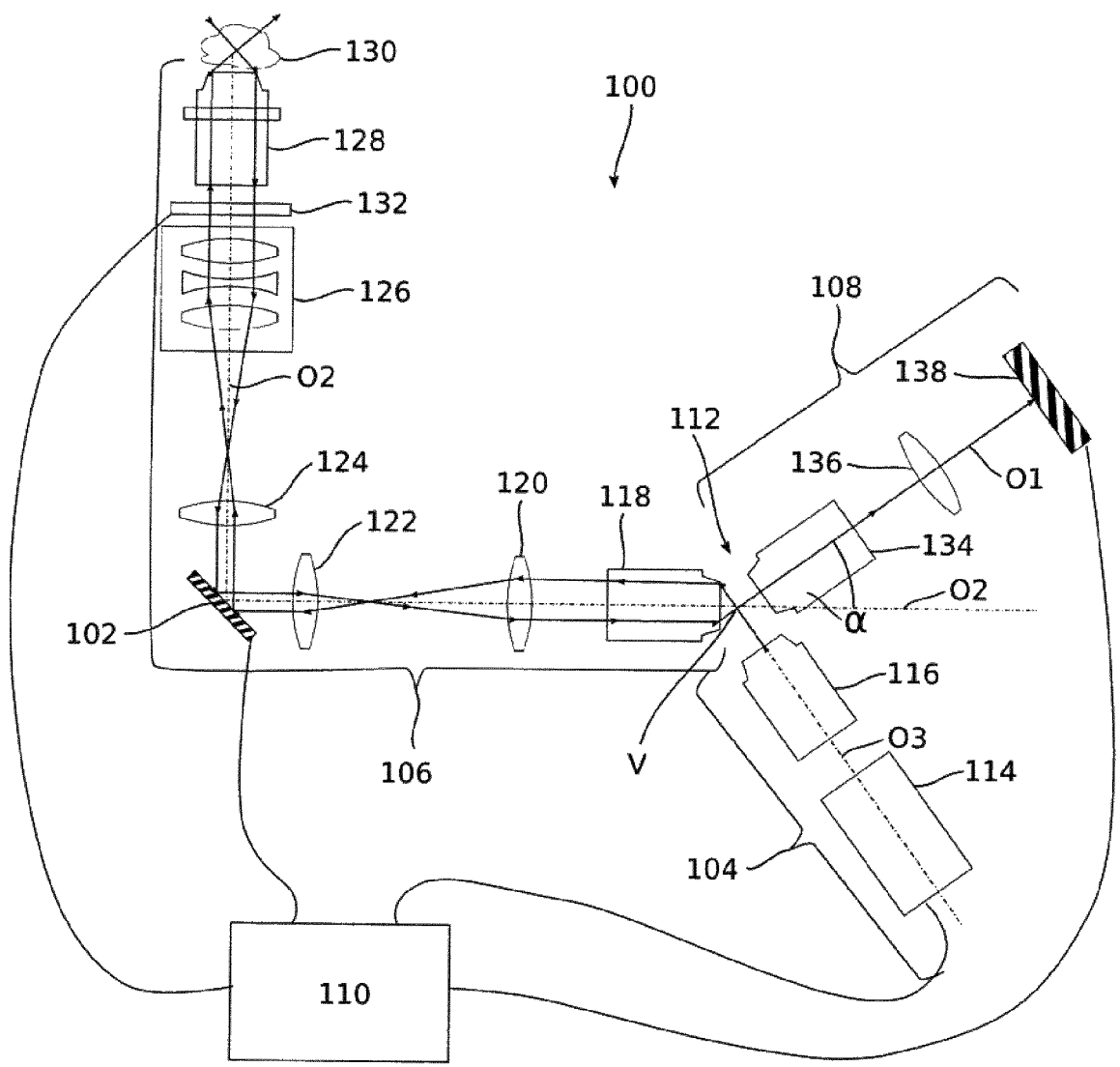
FIG. 1 is a schematic depiction of a light-sheet microscope comprising a scanning device according to some embodiments.

Embodiments of the present invention provide an optical system and a method that allow the illumination direction and the detection direction to be switched over in a simple manner in a light-sheet microscope.

According to some embodiments, the optical system for a light-sheet microscope comprises transporting optics configured to project into a sample a light sheet for illuminating a sample plane positioned obliquely to the optical axis of the transporting optics and to project the illuminated sample plane into an intermediate image space. The transporting optics comprises an interchanging system having at least one first and one second light-deflection element. The transporting optics is further configured to switch an illumination direction along which the light sheet illuminates the sample by alternately introducing the first and the second light-deflection element into a beam path of the transporting optics. The first light-deflection element causes a partial image inversion in only one direction and the second light-deflection element causes a complete image inversion in two directions.

The transporting optics project the light sheet into the sample. In the process, the light sheet extends with a parallel offset with respect to the optical axis of the transporting optics. As a result, the light sheet is guided into a portion of an entrance pupil of an object lens which faces the sample and is offset sideways from the middle of the entrance pupil. The entrance pupil of the object lens is thus under-illuminated at an off-center position, as a result of which the light sheet is guided into the sample obliquely to the optical axis. For this reason, a light-sheet microscope of this kind is also referred to as an oblique-plane microscope.

Introducing the first light-deflection element causes a first image inversion, for example a swapping of top and bottom in the beam path of the transporting optics upstream of the object lens. Introducing the second light-deflection element then causes, as it were, an additional swapping of left and right in the beam path of the transporting optics upstream of the object lens. Therefore, if the second light-deflection element is introduced into the beam path of the transporting optics, the light sheet is guided into another portion of the entrance pupil of the object lens facing the sample. In turn, this leads to the light sheet being guided into the sample from another direction obliquely to the optical axis. Consequently, by introducing the second light-deflection element, the illumination direction is switched.

In inverted microscopy arrangements, which can also be implemented as oblique-plane microscopes, the object lens is located below the sample stage. To prevent the microscope system from becoming too tall, the imaging beam path is typically deflected sideways by a deflection element (e.g. a mirror).

In an oblique-plane microscope, an image erecting unit, implemented by two mutually opposing object lenses tilted with respect to one another, is located in the detection beam path. To construct this arrangement at little cost and in as stable a manner as possible, the bend axis is typically defined by the gravitational axis. The bend axis is thus parallel to the optical axis of the sample-side object lens in an inverted microscope system. As a result, in the horizontal optical beam path between the deflection and the image erecting unit, mirror symmetry is retained in terms of top and bottom but not in terms of right and left.

To now be able to switch over the illumination direction and the detection direction of the oblique-plane microscope, it is necessary to swap the two sides right/left in the horizontal beam path. This can be done by two exchangeable mirror assemblies, which deflect to the right/to the left, each causing an even number and an odd number of mirroring processes and having a common position of their entrance and exit axis and the same optical path length through the two mirror assemblies. Compared with image-field rotators, for example an Abbe-Koenig rotator or a Schmidt-Pechan rotator, this solution has the advantage whereby the two mirror assemblies can be adjusted separately, the centering of the pupil and field imaging thereby being able to be ensured. However, its drawback is that additional deflection elements have to be installed, and these have a negative impact on both the imaging quality and the cost-effectiveness of the microscope system due to the finite reflectivity and surface quality and also their cost.

According to embodiments of the present invention, the swapping of the asymmetric direction of both the image field and of the pupil is achieved by modifying the above-mentioned deflection element, which makes a horizontal beam path out of the vertical one. This can be achieved by replacing a simple deflection element having a reflective surface with a deflection element having a roof edge, by means of an interchanging mechanism. Since two individual elements are used in this case too, these can be adjusted independently of one another, by contrast with an image-field rotation system, and the pupil and field imaging can thus be centered. Positioning the roof edge on a surface that corresponds to the reflective surface of the deflection element without a roof edge also ensures that the optical path lengths are equal. By way of example, this kind of pair of deflection elements could consist of a deflecting prism having a rear-surface mirror (or total reflection) and an Amici roof prism, or alternatively of a simple front-surface mirror and a roof mirror, which can be made from two individual elements, in order to produce an internal roof edge. When rear-surface mirrors are used, the prisms can also be tilted such that the entrance and exit surfaces are not perpendicular to the optical axis, so as to prevent reflections.

In a preferred embodiment, the light sheet is generated in the intermediate image space. Alternatively, the light sheet can also be coupled into the transporting optics, for example by means of a beam-splitter element.

In a preferred embodiment, the optical system comprises detection optics, the optical axis of which is tilted with respect to the optical axis of the transporting optics about a tilt axis that extends through the intermediate image space. In this embodiment, the sample planes projected into the intermediate image space by the transporting optics are projected by the detection optics onto, for example, an image sensor. In this case, the detection optics are preferably arranged such that the sample planes projected into the intermediate image space are perpendicular to the optical axis of the detection optics.

In a further preferred embodiment, the optical system comprises a scanning device for the successive illumination, by means of the light sheet, of a plurality of sample planes arranged one after the other in a scanning direction. Furthermore, the detection optics are configured in each case to generate a tomographic image from an image, generated in the intermediate image space, of the relevant sample plane. In each case, a tomographic image stack can be compiled from the tomographic images, which stack can be processed further to form a three-dimensional image, i.e. a 3D image of the sample. This makes it possible to generate high-resolution three-dimensional images of regions of the sample.

In a preferred embodiment, the scanning device comprises at least one grid mirror, by means of which the light sheet can be moved transversely to the optical axis of the transporting optics. Preferably, the grid mirror is arranged in an infinite beam path of the transporting optics, i.e. at a location along the beam path of the transporting optics at which the rays are as parallel as possible. This is a mechanically simple configuration of the scanning device.

In an alternative embodiment, the scanning device comprises at least one focusing apparatus for adjusting a sharpness plane of the transporting optics. This focusing apparatus can in particular be an object lens, facing the intermediate image space, of the transporting optics. Since in this case, unlike when a grid mirror is used, no infinite beam path is required within the beam path of the transporting optics, this alternative embodiment needs fewer optical elements in the beam path of the transporting optics. Accordingly, this embodiment can be configured more compactly.

In a preferred embodiment, the optical system comprises an image processing and control unit configured to introduce the first light-deflection element into the beam path of the transporting optics, to generate a first image dataset which represents a tomographic image stack compiled from the tomographic images, to introduce the second light-deflection element into the beam path of the transporting optics, to generate a second image dataset which represents a further tomographic image stack compiled from the tomographic images, and to process the first image dataset and the second image dataset to form a three-dimensional image of the sample. In the process, three-dimensional images of the sample are now recorded by the two deflection elements, i.e. with the detection plane tilted respectively by $+\alpha$ and $-\alpha$ relative to the optical axis, with an unchanged azimuth. Next, the two three-dimensional images are transformed into a common geometry, for example by way of a method as described in DE 10 2017 116 380 B3. Methods for registering and computing corresponding image datasets are known, for example, from Swoger et al., Optics Express, Vol. 15, Issue 13, pp. 8029-8042 (2007).

In a further preferred embodiment, the transporting optics have a single object lens facing the sample, the optical axis of said object lens being parallel to the tilt axis. The single object lens is simultaneously used to illuminate the sample by means of the light sheet and to detect the illuminated sample planes. Compared with alternative configurations having separate object lenses for illumination and detection, the embodiment having just one single object lens facing the sample has the advantage whereby the optical axes of the object lens can be oriented perpendicularly to a sample mount. As a result, reflections off the surface of the sample mount in particular are reduced, and the image quality of the optical system is increased.

In a further preferred embodiment, the first light-deflection element and the second light-deflection element each deflect the beam path of the transporting optics by 90°. In this embodiment, the optical system is particularly suitable for light-sheet microscopes that are configured as inverted microscopes. The optical axis of the object lens facing the sample is oriented in parallel with the direction of gravity. By contrast, the optical axes of the transporting optics and of the detection optics, which axes intersect in the intermediate image space, are located in a plane that is perpendicular to the direction of gravity. This arrangement is particularly stable and simple to arrange.

Preferably, the first light-deflection element is a deflecting mirror or a deflecting prism. The second light-deflection element is preferably a roof prism, a roof mirror, or an Amici prism. Using prisms as optical elements allows simple adjustment of the optical system. Mirror assemblies are more cost-effective.

Preferably, the second light-deflection element causes an image rotation through 90°, 180°, or 270°. In particular, other light-deflection elements can also be provided, each implementing different image rotations. As a result of this, it is possible to switch between more than two illumination directions and detection directions by means of the interchanging system.

In a preferred embodiment, the optical system comprises an illumination unit for generating the light sheet. Preferably, the illumination unit is arranged such that the optical axis of the illumination unit is positioned perpendicularly to the optical axis of the detection optics. In particular, the optical axes of the transporting optics, of the illumination unit, and of the detection optics intersect in the intermediate image space.

Embodiments of the present invention also relate to a light-sheet microscope comprising an optical system of the above-described type. The light-sheet microscope is implemented in particular as an inverted microscope.

Embodiments of the present invention further relate to a method for illuminating a sample in a light-sheet microscope. In the method, by means of transporting optics, a light sheet for illuminating a sample plane positioned obliquely to the optical axis of the transporting optics is projected into a sample, and the illuminated sample plane is projected into an intermediate image space. An illumination direction along which the light sheet illuminates the sample is switched by alternately introducing a first and a second light-deflection element into a beam path of the transporting optics. In the process, the first light-deflection element causes a partial image inversion in only one direction and the second light-deflection element causes a complete image inversion in two directions.

The method has the above-described advantages and can be developed in the same way, in particular by way of the features relating to the light-sheet microscope set out in the dependent claims.

FIG. 1 is a schematic depiction of a light-sheet microscope 100 comprising a scanning device 102 according to one embodiment.

The light-sheet microscope 100 comprises the scanning device 102, an illumination unit 104, transporting optics 106, detection optics 108, and a processor 110. The aforementioned elements together form an embodiment example of an optical system according to embodiments of the present invention.

The optical axis O1 of the detection optics 108 is tilted by a tilt angle $\alpha$ with respect to the optical axis O2 of the transporting optics 106. In the embodiment example shown in FIG. 1, the axis V of this tilt is parallel to the direction of gravity, i.e. perpendicular to the plane of the drawing of FIG. 1. In addition, the optical axis O3 of the illumination unit 104 is tilted about the tilt axis V with respect to the optical axis O2 of the transporting optics 106. In the process, the optical axis O3 of the illumination unit 104 is perpendicular to the optical axis O1 of the detection optics 108, such that the optical axis O3 of the illumination unit 104 is tilted with respect to the optical axis O2 of the transporting optics 106 by an angle of 90°−$\alpha$. The three aforementioned optical axes O1, O2, O3 intersect in an intermediate image space 112.

The illumination unit 104 comprises a light source 114 and an illumination object lens 116. The light source 114 generates a light sheet, for example by means of a cylindrical lens (not explicitly shown in FIG. 1), the light sheet extending, with respect to an oblique-angled coordinate system shown in FIG. 1, in an illumination direction A and an extension direction B perpendicular thereto. In the embodiment example shown, the extension direction B is parallel to the tilt axis V, i.e. the extension direction B points out of the plane of the drawing in the depiction according to FIG. 1. Alternatively, the light source 114 can also generate a quasi-static light sheet by means of a scanning element specifically provided for this purpose. The illumination object lens 116 projects the light sheet into the intermediate image space 112. Alternatively, the light sheet can also be coupled directly into the transporting optics 106. An alternative embodiment of this kind is described further below with reference to FIG. 2.

As viewed from the intermediate image space 112, the transporting optics 106 comprise a projection object lens 118 facing the intermediate image space 112, a first tube lens 120, a first eyepiece 122, a second eyepiece 124, a second tube lens 126 which, in the embodiment example shown, is configured as a lens system containing a plurality of lenses, and a further object lens 128 facing a sample 130. Between the first eyepiece 122 and the second eyepiece 124 there is arranged the scanning device 102, which, in the embodiment shown, is formed by a grid mirror at which the optical axis O2 of the transporting optics 106 is deflected. By means of the movable grid mirror, the light sheet can be moved in a scanning direction C, which is perpendicular to the optical axis O2 of the transporting optics 106.

To simplify the drawing, in FIG. 1 the object lens 128 facing the sample is shown as if it were positioned in the plane of the drawing of FIG. 1 like the other components of the transporting optics 106. In reality, however, it is oriented perpendicularly to the plane of the drawing, as is also made clear by FIGS. 4 and 5.

Figure 4:
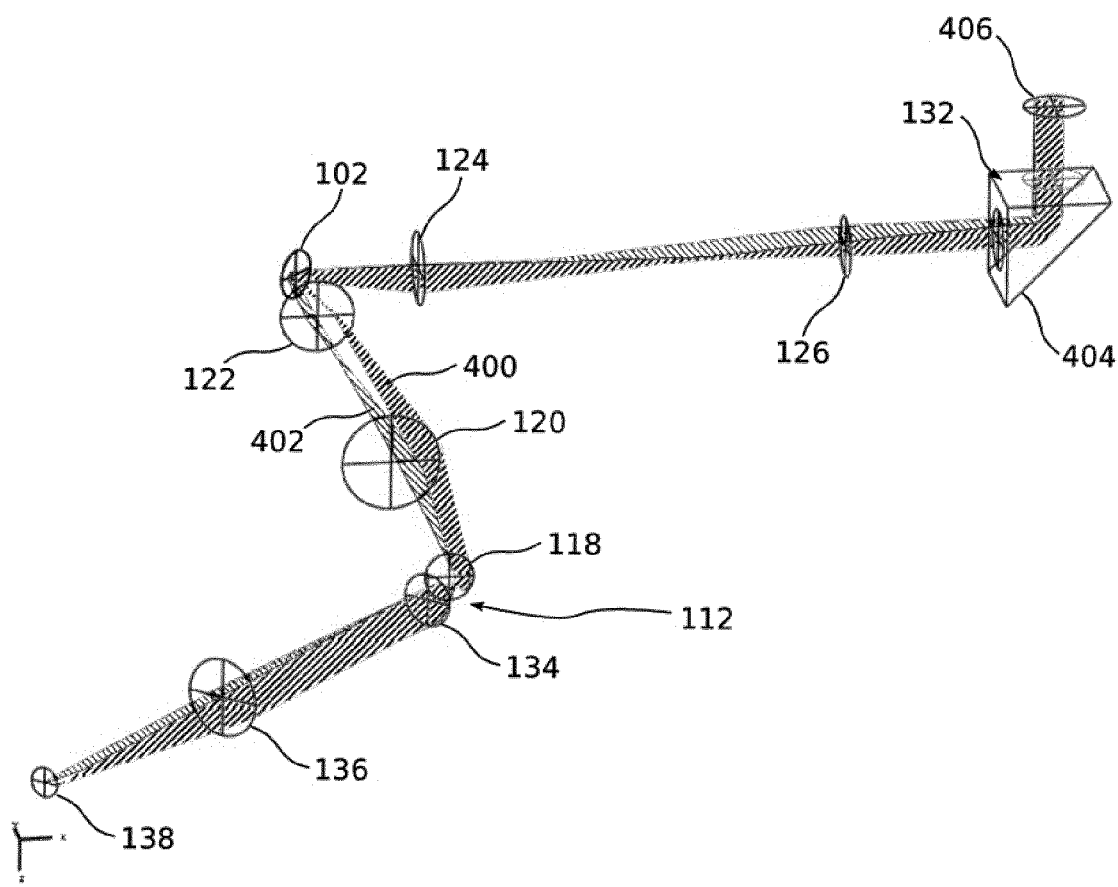
FIG. 4 is a schematic depiction of part of the optical system of the light-sheet microscope according to FIG. 1 and FIG. 2 according to some embodiments.
Figure 5:
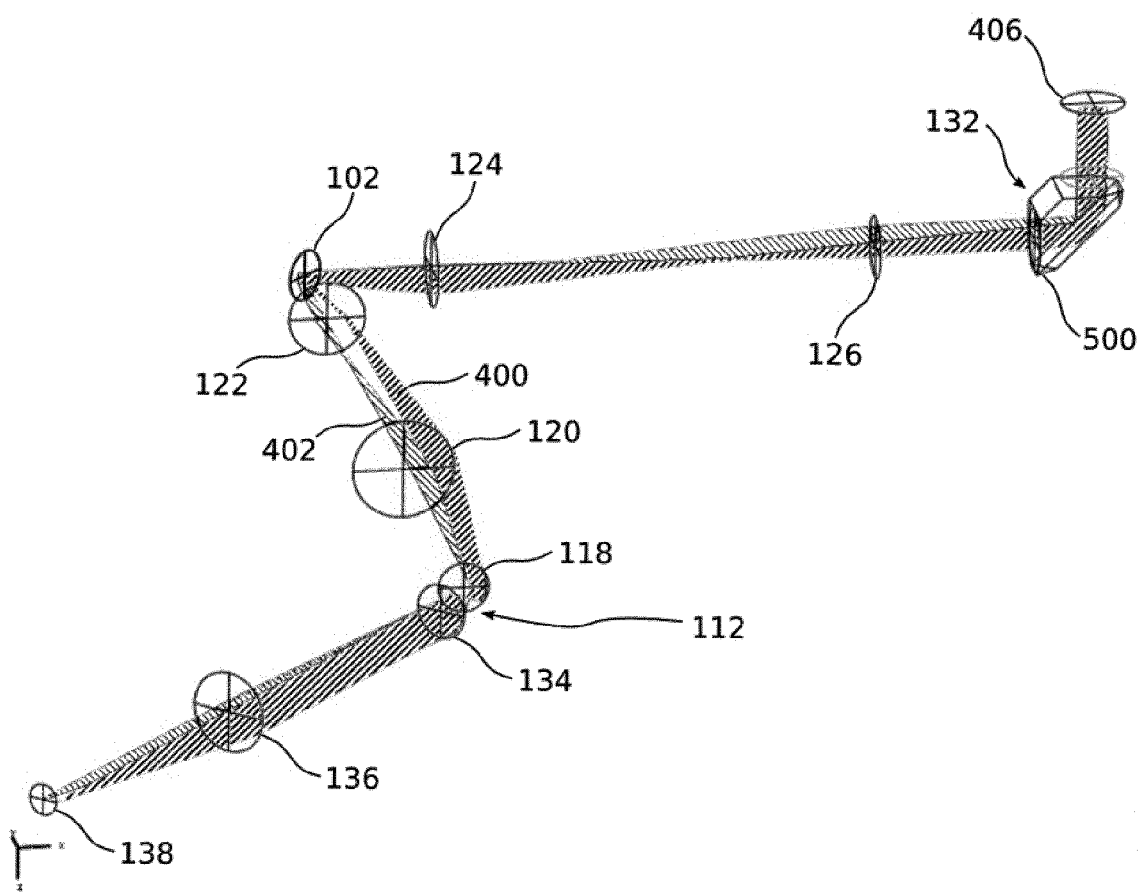
FIG. 5 is a further schematic depiction of part of the optical system of the light-sheet microscope according to FIG. 1 and FIG. 2 according to some embodiments.

An interchanging system 132 is arranged between the second tube lens 126 and the object lens 128 and is configured to selectively introduce a first light-deflection element 404 and a second light-deflection element 500 (cf. FIGS. 4 and 5) into the beam path of the transporting optics 106. Both the first light-deflection element 404 and the second light-deflection element 500 cause a deflection of the optical axis O2 of the transporting optics 106 by 90° out of the plane of the drawing of FIG. 1, as shown in FIGS. 4 and 5. This deflection causes an axis mirroring of the virtual image at this point of the transporting optics 106 along an axis that is perpendicular to the optical axis O2 of the transporting optics 106 and perpendicular to the direction of gravity. This axis mirroring causes, as it were, a swapping of top and bottom in the virtual image and is also referred to below as the first image inversion. The second light-deflection element 500 additionally causes a second axis mirroring along an axis that is perpendicular to the optical axis O2 of the transporting optics 106 and parallel to the direction of gravity. The second axis mirroring causes, as it were, a swapping of left and right in the virtual image and is also referred to below as the second image inversion.

The transporting optics 106 project the light sheet out of the intermediate image space 112 into the sample 130. In the process, the illuminating light that generates the light sheet extends with a parallel offset with respect to the optical axis O2 of the transporting optics 106. As a result, the light sheet is guided into a portion of an entrance pupil 406 (see FIGS. 4 and 5) of the object lens 128, which is offset sideways with respect to the optical axis O2 of the transporting optics 106 and thus with respect to the middle of the entrance pupil 406 (to the left of the optical axis of the transporting optics 106 in FIG. 1). The entrance pupil 406 of the object lens 128 is thus under-illuminated in an off-center manner, resulting in the light sheet being guided into the sample 130 obliquely to the optical axis O2 of the object lens 128.

Introducing the second light-deflection element 500 causes a swapping of left and right in the beam path of the transporting optics 106 upstream of the object lens 128. Therefore, if the second light-deflection element 500 is introduced into the beam path of the transporting optics 106, the light sheet is guided into another portion of the entrance pupil 406 of the object lens 128, which portion is positioned to the right of the optical axis O2 of the transporting optics 106 in FIG. 1. In turn, this results in the light sheet being guided into the sample 130 from another direction obliquely to the optical axis of the object lens 128. Consequently, introducing the second light-deflection element 500 achieves a switching of the illumination direction.

As viewed from the intermediate image space 112, the detection optics 108 comprise a detection object lens 134, a tube lens 136, and an image sensor 138. Detection light proceeding from the sample 130 and transported into the intermediate image space 112 by the transporting optics 106 is guided onto the image sensor 138 by the detection object lens 134 and the tube lens 136.

The processor 110 is connected to the interchanging system 132, the light source 114, the scanning device 102, and the image sensor 138. The processor 110 is configured to control the elements coupled to it and to process image data generated by the image sensor 138 in order to generate a three-dimensional image of the sample 130. This image generation is described in more detail below with reference to FIG. 8. The processor 110 thus forms an image processing and control unit of the light-sheet microscope 100.

Figure 2:
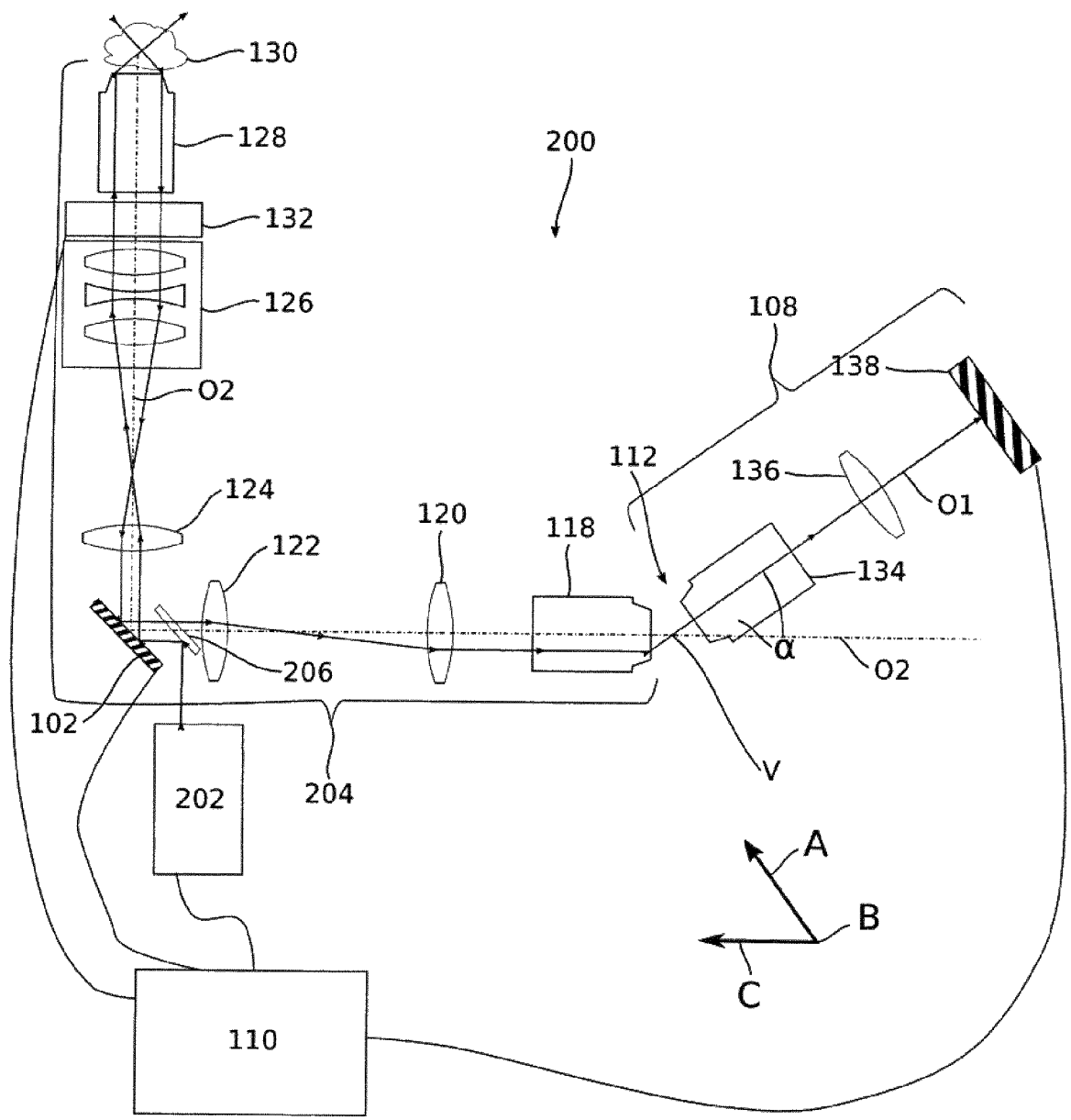
FIG. 2 is a schematic depiction of a light-sheet microscope comprising an alternative coupling-in of the illumination according to some embodiments.

FIG. 2 is a schematic depiction of a light-sheet microscope 200 according to a further embodiment. The light-sheet microscope 200 according to FIG. 2 differs from the light-sheet microscope 100 according to FIG. 1 on account of the arrangement of the illumination unit 202 and thus on account of the manner in which the light sheet is coupled into the transporting optics 204. Identical and identically functioning elements are denoted by the same reference signs in FIGS. 1 and 2.

The transporting optics 204 of the light-sheet microscope 200 according to FIG. 2 comprise a beam-splitter element 206, which is implemented as a dichroic beam splitter in the embodiment example shown. The beam-splitter element 206 is arranged in the beam path of the transporting optics 204 between the first eyepiece 122 and the grid mirror of the scanning device 102. In FIG. 2, the illumination unit 202 is arranged below the beam-splitter element 206 and is shown as a single block to simplify the drawing. The light sheet generated by the illumination unit 202 is coupled into the beam path of the transporting optics 204 by the beam-splitter element 206. Unlike in the light-sheet microscope 100 according to FIG. 1, the light sheet in the light-sheet microscope 200 according to FIG. 2 is thus not generated in the intermediate image space 112.

Figure 3:
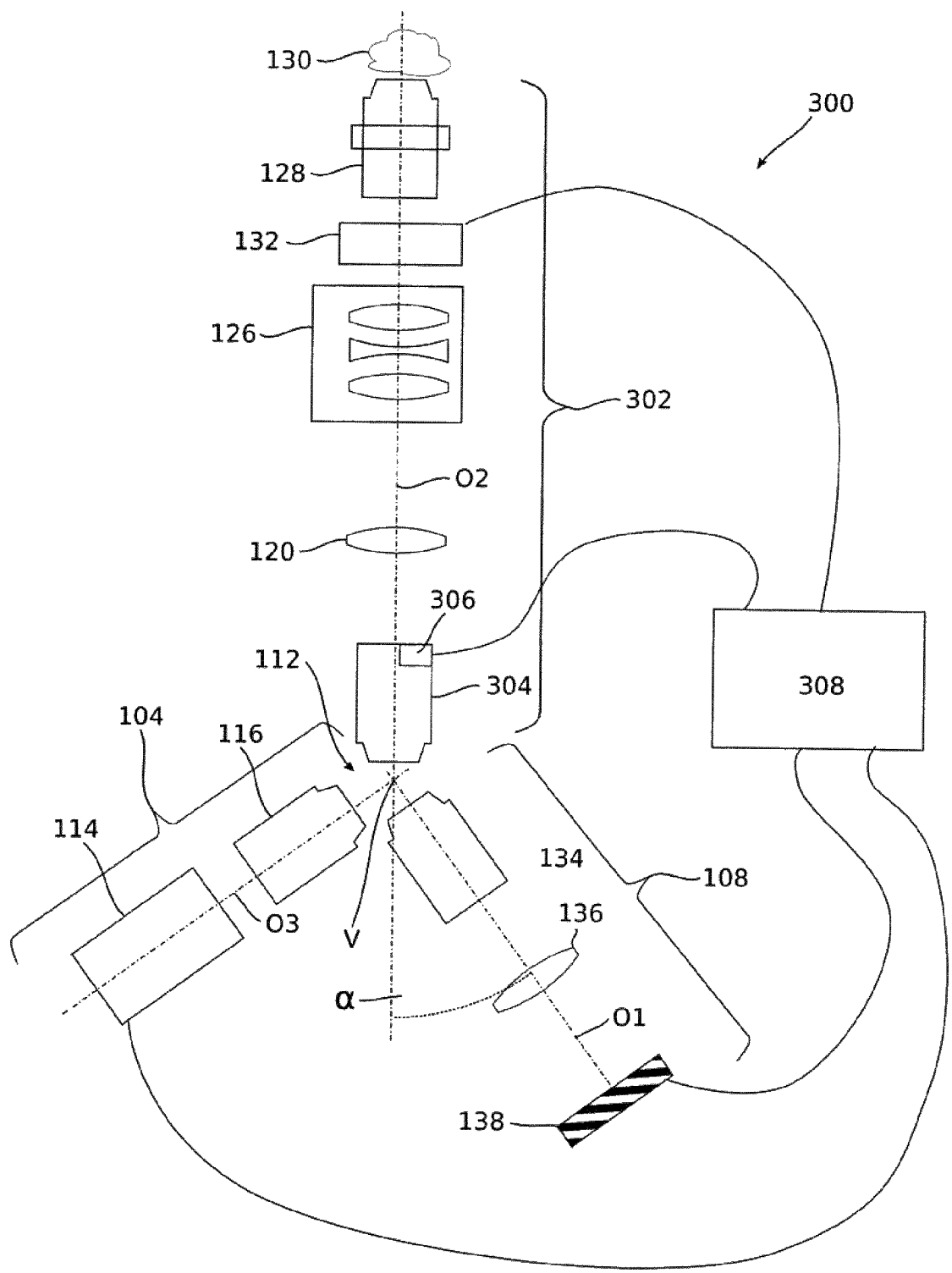
FIG. 3 shows an oblique-plane microscope comprising an alternative scanning device according to some embodiments.

FIG. 3 is a schematic depiction of a light-sheet microscope 300 according to a further embodiment. The light-sheet microscope 300 according to FIG. 3 differs from the light-sheet microscopes 100, 200 shown in FIGS. 1 and 2 substantially in that the scanning by the light sheet is done axially, i.e. along the optical axis O2 of the transporting optics 302. Identical and identically functioning elements are denoted by the same reference signs in FIGS. 1 to 3.

In the embodiment shown in FIG. 3, as viewed from the intermediate image space 112 the transporting optics 302 comprise a projection object lens 304, the two tube lenses 120, 126, and the object lens 128 facing the sample 130. The projection object lens 304 has an electronic focusing apparatus 306, which is configured to focus the light sheet onto different planes in the sample 130. The electronic focusing apparatus 306 is connected to the processor 308.

In the embodiment according to FIG. 3, the scanning device is formed by the electronic focusing apparatus 306. The light sheet, and simultaneously the detection plane coplanar therewith, can be moved along the optical axis O2 of the transporting optics 302 by the electronic focusing apparatus 304.

FIGS. 4 and 5 are each schematic depictions of part of the optical system of the light-sheet microscope 100, 200 according to FIGS. 1 and 2. For the sake of clarity, the illumination unit 104, 202 and the beam-splitter element 206 are omitted in each of FIGS. 4 and 5. FIGS. 4 and 5 show light beams 400, 402 of off-axis and paraxial rays in different hatchings. The light beam 400 of off-axis rays corresponds to the light sheet that is generated precisely having the parallel offset with respect to the optical axis O2 of the transporting optics 106, 204.

FIG. 4 shows an operating state in which the first light-deflection element 404 is introduced into the beam path of the transporting optics 106, 204 by the interchanging system 132. The first light-deflection element 404 is configured, by way of example, as a prism. The first light-deflection element 404 causes the first image inversion, i.e. the deflection of the optical axis O2 of the transporting optics 106, 204 by 90° toward the entrance pupil 406 of the object lens 128. It can be clearly seen in FIG. 4 that the parallel offset of the light sheet with respect to the optical axis O2 of the transporting optics 106, 204 results in the light sheet entering the entrance pupil 406 with a sideways offset from the middle of the entrance pupil 406 of the object lens 128. In the example according to FIG. 4, the light sheet enters the entrance pupil 406 of the object lens 128 to the left of center as viewed from the transporting optics 106, 204.

FIG. 5 shows an operating state in which the second light-deflection element 500 is introduced into the beam path of the transporting optics 106 by the interchanging system 132. The second light-deflection element 500 is configured, by way of example, as an Amici roof prism. The second light-deflection element 500 causes both the first image inversion and the second image inversion, i.e. the swapping of left and right in the virtual image. As a result of this swapping, the light sheet in the operating state according to FIG. 5 enters a different portion of the entrance pupil 406 of the object lens 128 compared with the operating state according to FIG. 4, in which the first light-deflection element 404 is introduced into the beam path of the transporting optics 106, 204. In the example according to FIG. 5, the light sheet enters the entrance pupil 406 of the object lens 128 to the right of center as viewed from the transporting optics 106, 204.

When FIGS. 4 and 5 are viewed together, it can be seen how, using the interchanging system 132, it is possible to control which portion of the entrance pupil 406 of the object lens 128 the light sheet enters. In both cases, the object lens 128 causes a deflection of the light sheet toward the optical axis of the object lens 128. Consequently, by means of the interchanging system 132 and by selectively introducing one of the two light-deflection elements 404, 500 it is possible to determine the direction from which the sample 130 is illuminated by the light sheet.

Figure 6:
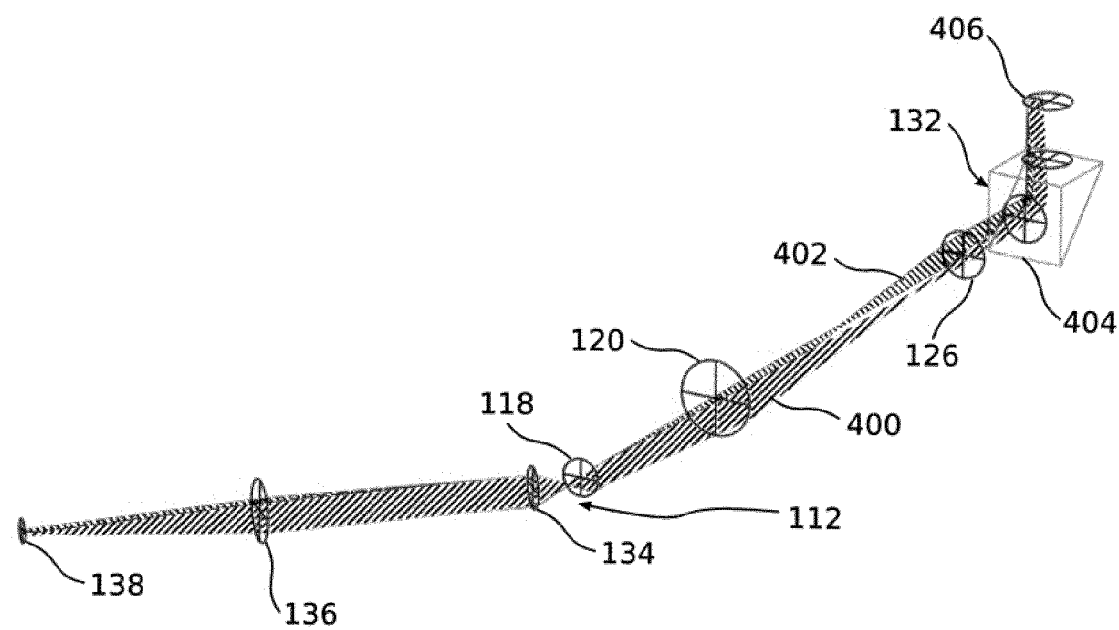
FIG. 6 is a schematic depiction of part of the optical system of the light-sheet microscope according to FIG. 3 according to some embodiments.
Figure 7:
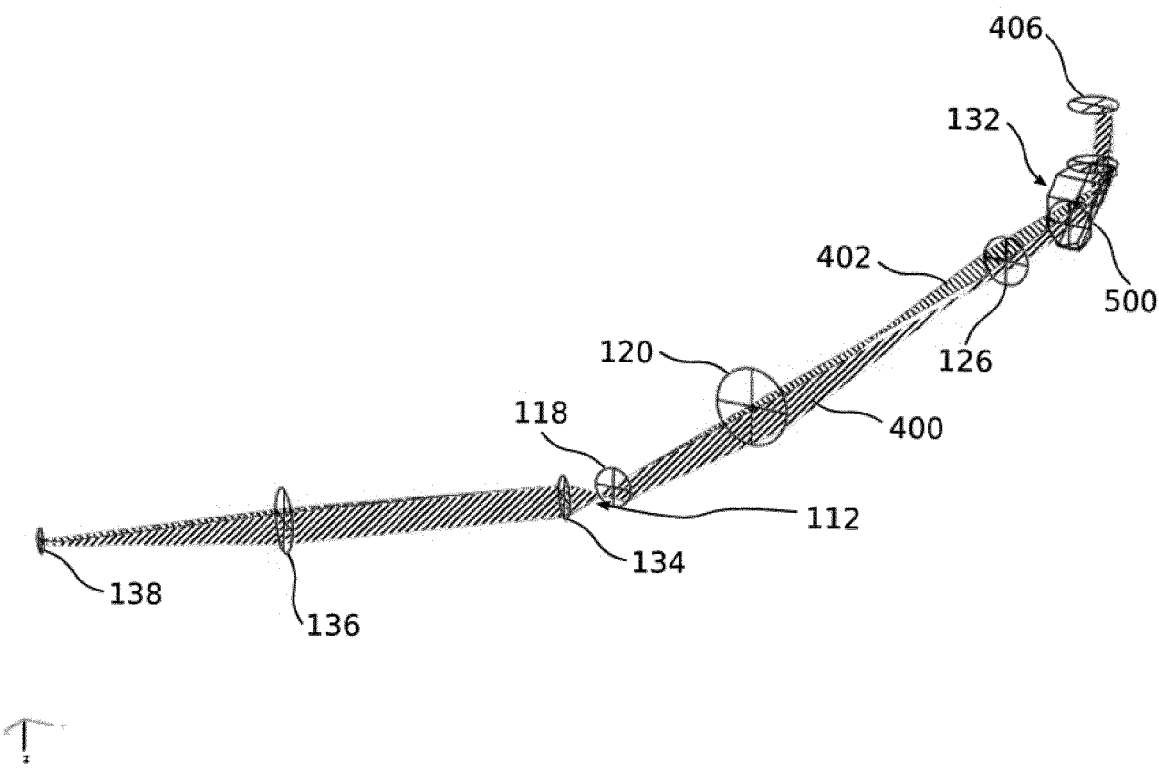
FIG. 7 is a further schematic depiction of part of the optical system of the light-sheet microscope according to FIG. 3 according to some embodiments.

FIGS. 6 and 7 are each schematic depictions of part of the optical system of the light-sheet microscope 300 according to FIG. 3. For the sake of clarity, the illumination unit 104 is omitted in each of FIGS. 6 and 7. In FIGS. 6 and 7, light beams of off-axis and paraxial rays 400, 402 are shown in different hatchings. The light beam 400 of off-axis rays again corresponds to the light sheet. Unlike the optical system according to FIGS. 4 and 5, the optical system shown in FIGS. 6 and 7 does not have a grid mirror. As a result, the two eyepieces 122, 124 can be omitted.

Figure 8:
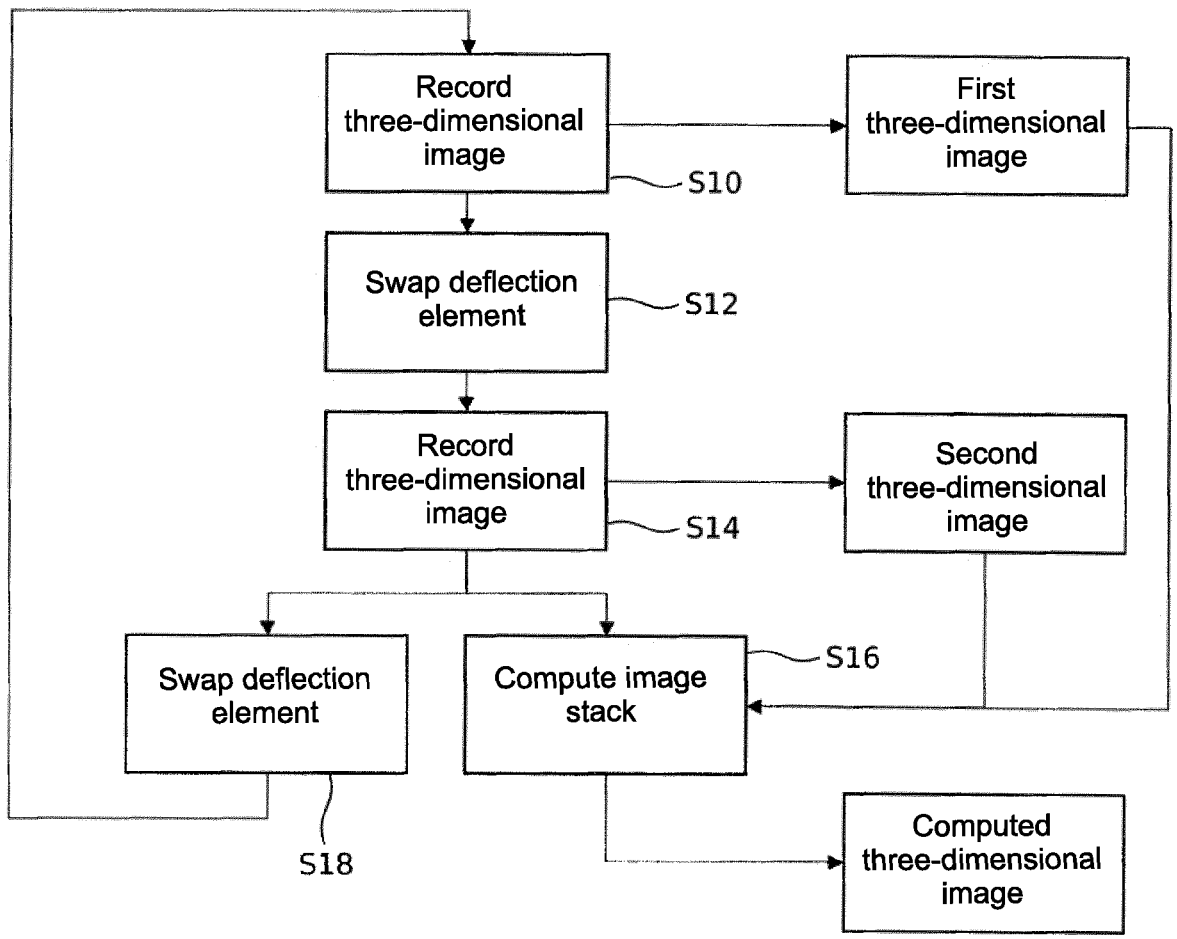
FIG. 8 shows an example method for generating a three-dimensional image of a sample according to some embodiments.

FIG. 8 shows the flow chart of an example method for generating a three-dimensional image of the sample 130 by means of the light-sheet microscope according to any of FIGS. 1 to 3.

In step S10, a first three-dimensional image is generated. For this purpose, by means of the scanning device 102, a plurality of sample planes arranged one after the other in the scanning direction are illuminated successively by the light sheet. In the process, in each case the detection optics 108 generate a tomographic image by projecting an image, generated in the intermediate image space 112, of the relevant illuminated sample plane onto the image sensor 138. The individual tomographic images are compiled into a tomographic image stack, which is then processed further to form the three-dimensional image.

In step S12, the light-deflection element 404, 500, which is located precisely in the beam path of the transporting optics 106, 204, 302, is then exchanged for the other light-deflection element 500 or 404, respectively, by means of the interchanging system 132. As a result, the illumination direction and the detection direction of the light-sheet microscope 100, 200, 300 are switched around.

In step S14, the steps carried out in step S10 for generating the first three-dimensional image are repeated in order to generate a second three-dimensional image. The second three-dimensional image differs from the first three-dimensional image on account of the illumination direction from which the sample planes are illuminated by the light sheet, and on account of the detection direction in which these sample planes are projected onto the image sensor 138.

In step S16, the two three-dimensional images are computed into a single high-resolution three-dimensional image. Alternatively or additionally, after step S14 the light-deflection element 500, 404 located in the beam path of the transporting optics 106, 204, 302 is exchanged for the other light-deflection element 404 or 500, respectively, by means of the interchanging system 132, and steps S10 to S14 are repeated. As a result, a time series of three-dimensional images can be generated.

The term "and/or" covers all combinations of one or more of the associated listed elements and can be shortened to "/".

Although some aspects have been described in the context of a device, it is self-evident that these aspects also constitute a description of the corresponding method, a block or a device corresponding to a method step or to a function of a method step. Likewise, aspects described in the context of a method step also constitute a description of a corresponding block, element, or property of a corresponding device.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Light-sheet microscope
102 Scanning device
104 Illumination unit
106 Transporting optics
108 Detection optics
110 Processor
112 Intermediate image space
114 Light source
116 Illumination object lens
118 Projection object lens
120 Tube lens
122, 124 Eyepiece
126 Tube lens
128 Object lens
130 Sample
132 Interchanging system
134 Detection object lens
136 Tube lens
138 Image sensor
200 Light-sheet microscope
202 Illumination unit
204 Transporting optics
206 Beam-splitter element
300 Light-sheet microscope
302 Transporting optics
304 Projection object lens
306 Focusing apparatus
308 Processor
400, 402 Pencil of rays
404 Light-deflection element
406 Entrance pupil
500 Light-deflection element
O1, O2, O3 Optical axis

The invention claimed is:

1. An optical system for a light-sheet microscope, the optical system comprising:
    transporting optics configured to project, into a sample, a light sheet for illuminating a sample plane positioned obliquely to an optical axis of the transporting optics and to project the illuminated sample plane into an intermediate image space,
    wherein the transporting optics comprises an interchanging system that includes a first light-deflection element and a second light-deflection element, the interchanging system being configured to switch an illumination direction along which the light sheet illuminates the sample by alternately introducing the first light-deflection element and the second light-deflection element into a beam path of the transporting optics, so that the light sheet illuminates the sample from a first direction when only the first light-deflection element is in the beam path, and the light sheet illuminates the sample from a second direction when only the second light-deflection element is in the beam path, the second direction being different from the first direction, and
    wherein the first light-deflection element causes a partial image inversion in only one direction and the second light-deflection element causes a complete image inversion in two directions.

2. The optical system according to claim 1, wherein the transporting optics are configured to project into the sample the light sheet generated in the intermediate image space for illuminating the sample plane positioned obliquely to the optical axis of the transporting optics.

3. The optical system according to claim 1, further comprising detection optics, wherein an optical axis of the detection optics is tilted with respect to the optical axis of the transporting optics about a tilt axis that extends through the intermediate image space.

4. The optical system according to claim 3, further comprising a scanning device for successive illumination, by the light sheet, of a plurality of sample planes arranged successively in a scanning direction, wherein the detection optics) are configured in each case to generate a tomographic image from an image of a respective sample plane generated in the intermediate image space.

5. The optical system according to claim 4, wherein the scanning device comprises a grid mirror configured to move the light sheet transversely to the optical axis of the transporting optics.

6. The optical system according to claim 4, wherein the scanning device comprises a focusing apparatus for adjusting a sharpness plane of the transporting optics.

7. The optical system according to claim 4, further comprising an image processing and control unit configured to introduce the first light-deflection element into the beam path of the transporting optics to generate a first image dataset which represents a first tomographic image stack compiled from the tomographic images, and to introduce the second light-deflection element into the beam path of the transporting optics to generate a second image dataset which represents a second tomographic image stack compiled from the tomographic images, and to process the first image dataset and the second image dataset to form a three-dimensional image of the sample.

8. The optical system according to claim 1, wherein the transporting optics has a single object lens facing the sample, an optical axis of the object lens being parallel to a tilt axis that extends through the intermediate image space.

9. The optical system according to claim 1, wherein each of the first light-deflection element and the second light-deflection element deflects the beam path of the transporting optics by 90°.

10. The optical system according to claim 1, wherein the first light-deflection element comprises a deflecting mirror.

11. The optical system according to claim 1, wherein second light-deflection element is a roof prism.

12. The optical system according to claim 1, wherein the second light-deflection element causes an image rotation through 90°.

13. A light-sheet microscope comprising the optical system according to claim 1.

14. The light-sheet microscope according to claim 13, wherein the light-sheet microscope is an inverted microscope.

15. A method for illuminating a sample in a light-sheet microscope, the method comprising:
    projecting, using transporting optics, a light sheet into a sample to illuminate a sample plane positioned obliquely to an optical axis of the transporting optics, wherein the illuminated sample plane is projected into an intermediate image space,
    switching an illumination direction along which the light sheet illuminates the sample by alternately introducing a first light-deflection element and a second light-deflection element into a beam path of the transporting optics, so that the light sheet illuminates the sample from a first direction when only the first light-deflection element is in the beam path, and the light sheet illuminates the sample from a second direction when only the second light-deflection element is in the beam path, the second direction being different from the first direction, wherein the first light-deflection element causes a partial image inversion in only one direction and the second light-deflection element causes a complete image inversion in two directions.

16. The optical system according to claim 1, wherein the first light-deflection element comprises a deflecting prism.

17. The optical system according to claim 1, wherein the second light-deflection element comprises a roof mirror, or an Amici prism.

18. The optical system according to claim 1, wherein the second light-deflection element comprises an Amici prism.

19. The optical system according to claim 1, wherein the second light-deflection element causes an image rotation through 180°, or 270°.

20. The optical system according to claim 1, wherein the second light-deflection element causes an image rotation through 270°.

* * * * *